United States Patent [19]

Forrest

[11] 4,309,963
[45] Jan. 12, 1982

[54] ANIMAL HANDLING APPARATUS

[76] Inventor: William J. Forrest, 3400 NW. Expressway, Oklahoma City, Okla. 73112

[21] Appl. No.: 209,004

[22] Filed: Nov. 21, 1980

[51] Int. Cl.$^3$ ............................................. A01K 15/00
[52] U.S. Cl. .................................................... 119/96
[58] Field of Search .................. 119/96, 98, 101, 102, 119/103, 100; 294/17; 414/754, 758, 770, 780, 781

[56] References Cited

U.S. PATENT DOCUMENTS 2,967,510  1/1961  Stoody ................................ 119/103
3,308,790  3/1967  Crowson ............................ 119/103

Primary Examiner—Hugh R. Chamblee
Attorney, Agent, or Firm—Dunlap, Codding & McCarthy

[57] ABSTRACT

An animal handling apparatus for turning over from one side to the other side a relatively large animal with front and rear legs, a back, a stomach, and opposite sides including a frame, a first brace connected to the frame, a winch connected to the frame, a cable having opposite ends with one end connected to the winch, a handle with one end connected to the frame, and a second brace connected to the frame. In operation, the animal handling apparatus is positioned near the animal's back, the cable is extended under the animal and secured to the animal's front legs, the winch retrieves the cable drawing the animal's front legs toward the animal's stomach, and the first brace engages the animal's back near one side of the animal. The handle then is moved pulling the animal's front legs in a direction generally toward the animal handling apparatus and generally under the animal, thereby causing the animal to be turned over from one side to the other, the first and the second braces engaging the animal to maintain the turning engagement between the animal and the animal handling apparatus.

8 Claims, 2 Drawing Figures

ANIMAL HANDLING APPARATUS

BACKGROUND OF THE INVENTION

1. Field of the Invention

The present invention generally relates to an animal handling apparatus and, more particularly, but not by way of limitation, to an animal handling apparatus for turning over from one side to the other side a relatively large animal, such as a cow, for example.

2. Brief Description of the Prior Art

U.S. Pat. No. 2,967,510, issued to Stoody, disclosed a tilting cattle table. A bull or the like was secured to the table via straps which passed about the bull's body while the bull was in a standing position and the table was then tilted to support the bull while various operations were carried out.

U.S. Pat. No. 1,746,115, issued to Hermanni, disclosed a hog holder which included a strap which pulls one leg of the hog generally toward the hog's body.

U.S. Pat. No. 4,013,313, issued to Gardels, disclosed a pipe turning tool comprising a handle having an arcuate member at its forward end for engaging a pipe and a detent which engaged a discontinuity on the pipe so that the pipe turning tool could be engaged with the side of a pipe so as to permit the turning of the pipe.

German Pat. No. 2,114,288, disclosed a pig transporting barrow constructed to raise the hind quarters of a pig. The barrow had the general form of a two-wheeled dolly with a cross bar attached to its lower end. The cross bar was inserted under the hind quarters of the pig and the barrow was then rotated about its wheels to raise the hind quarters of the pig.

DESCRIPTION OF THE PREFERRED EMBODIMENT

Figure 1:
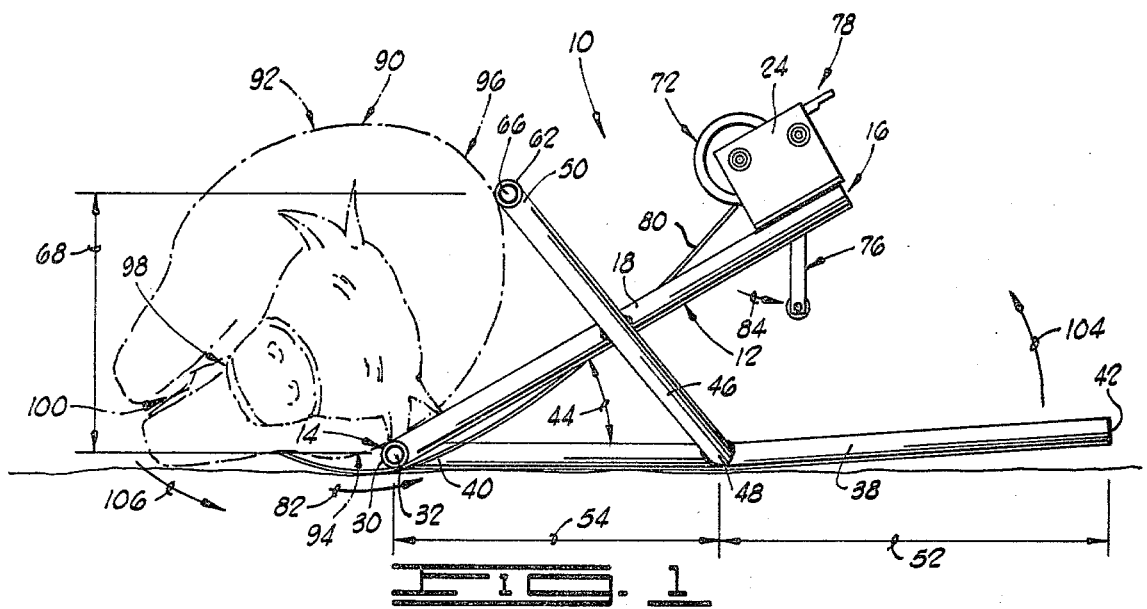
FIG. 1 is a side elevational view of an animal handling apparatus constructed in accordance with the present invention, the animal handling apparatus being shown in FIG. 1 connected to an animal and positioned to turn the animal over from one side to the other.
Figure 2:
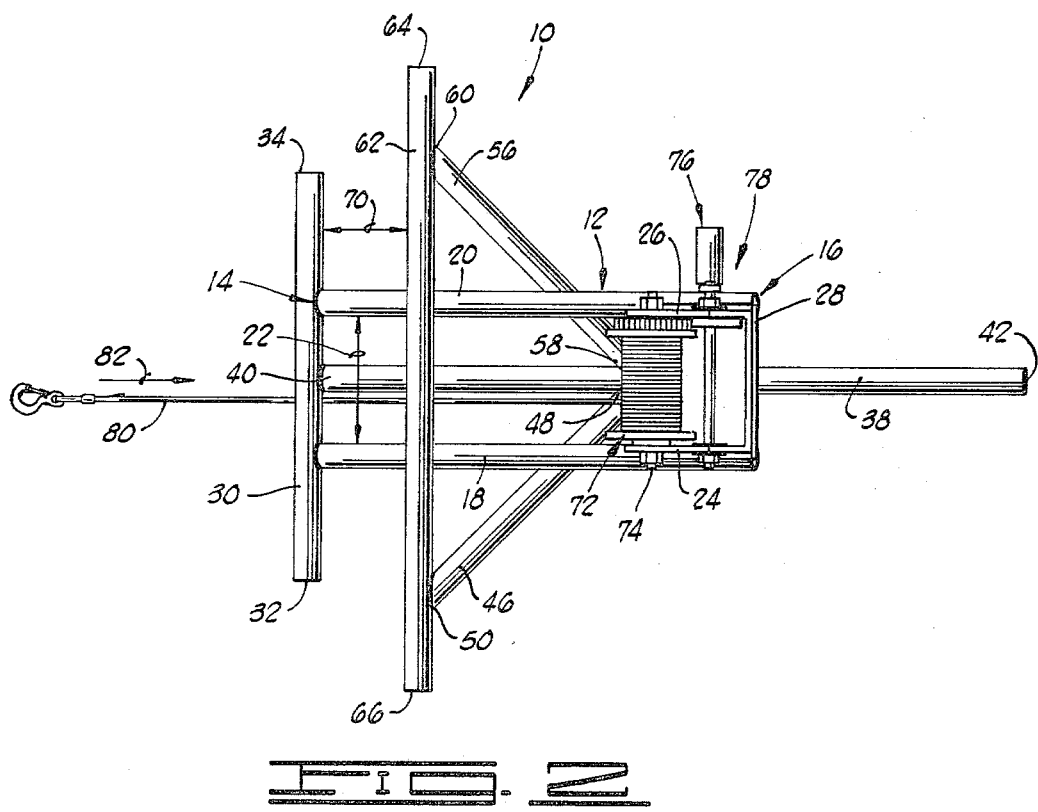
FIG. 2 is a top plan view of the animal handling apparatus of FIG. 1.

Shown in FIGS. 1 and 2 and designated therein by the general reference numeral 10 is an animal handling apparatus which is constructed in accordance with the present invention. The animal handling apparatus 10 is constructed to facilitate in turning over a relatively large animal from one side to the other side in a relatively fast, convenient manner.

The animal handling apparatus 10 includes a frame 12 having a first end 14 and a second end 16. The frame 12 is generally rectangularly shaped and includes a first side bar 18 and a second side bar 20. The first side bar 18 is spaced a distance 22 from the second side bar 20, and the first side bar 18 extends generally parallel with respect to the second side bar 20.

One end of a first side plate 24 is connected to the first side bar 18 generally near the second end 16 of the frame 12, the first side plate 24 extending generally perpendicularly upwardly from the first side bar 18. One end of a second side plate 26 is connected to the second side bar 20 generally near the second end of the frame 12, the second side plate 26 extending generally perpendicularly upwardly from the second side bar 20.

One end of an end bar 28 is connected to the first side bar 18 generally near the second end 16 of the frame 12, and the opposite end of the end bar 28 is connected to the second side bar 20 generally near the second end 16 of the frame 12.

A first brace 30 is connected to the first end 14 of the frame 12, the first brace 30 being positioned on the frame 12 to be engageable with a portion of the animal during the operation of the animal handling apparatus 10. The first brace 30 extends generally perpendicularly with respect to the frame 12 or the side bars 18 and 20. The first brace 30 has a generally circularly shaped cross section and has opposite ends 32 and 34. The first brace 30 has a length, the distance generally between the opposite ends 32 and 34, which is sufficient to maintain engaging contact with the animal during the operation of the animal handling apparatus 10.

A handle 38 is connected to the frame 12 and extends a distance from the frame 12. More particularly, the handle 38 has opposite ends 40 and 42, and the end 40 is connected to the first brace 30 at a position generally mid-way between the opposite ends 32 and 34, the handle 38 extending generally angularly away from the first brace 30 and frame 12 at an angle 44 with respect to the frame 12 and terminating with the end 42.

The animal handling apparatus 10 includes a first frame bar 46 having opposite ends 48 and 50. The end 48 of the first frame bar 46 is connected to the handle 38 at a position generally between the opposite ends 40 and 42 of the handle 38, the connection between the first frame bar 46 and the handle 38 being spaced a distance 52 from the end 42 of the handle 38 and spaced a distance 54 from the end 40 of the handle 38. The first frame bar 46 extends angularly upwardly and outwardly from the handle 38 and in a direction generally toward and away from the end 40 of the handle 38 which is connected to the first brace 30. A portion of the first frame bar 46, generally between the opposite ends 48 and 50 of the first frame bar 46, is disposed near one side of the frame 12, or more particularly, generally near the first side bar 18 and generally between the opposite ends of the first side bar 18. The first frame bar 46 is connected to the frame 12 or, more particularly, connected to the first side bar 18 at a position generally between the opposite ends of the first side bar 18.

The animal handling apparatus 10 also includes a second frame bar 56 having opposite ends 58 and 60. The end 58 of the second frame bar 56 is connected to the handle 38 at the same position as the first side bar 46, generally between the opposite ends 40 and 42 of the handle 38, the connection between the second frame bar 56 and the handle 38 being spaced the distance 52 from the end 42 of the handle 38 and spaced the distance 54 from the end 40 of the handle 38. The second frame bar 56 extends angularly upwardly and outwardly from the handle 38 and in a direction generally toward and away from the end 40 of the handle 38 which is connected to the first brace 30. A portion of the second frame bar 56, generally between the opposite ends 58 and 60 of the second frame bar 56, is disposed near one side of the frame 12 or, more particularly, generally near the second side bar 20 and generally between the opposite ends of the second side bar 20. The second frame bar 56 is connected to the frame 12 or, more particularly, to the second side bar 20 at a position generally between the opposite ends of the second side bar 20.

The end 50 of the first frame bar 46 is generally aligned with the end 60 of the second frame bar 56. A second brace 62 having opposite ends 64 and 66 is connected to the ends 50 and 60 of the first and the second frame bars 46 and 56, respectively, the second brace 62 extending generally perpendicularly with respect to the first and the second frame bars 46 and 56. The second brace 62 has a generally circularly shaped cross section and is constructed and positioned for engaging the animal during the operation of the animal handling apparatus 10.

The first and the second frame bars 46 and 56 are positioned to support the second brace 62 a distance 68 generally above the first brace 30. The first and the second frame bars 46 and 56 further are positioned to support the second brace 62 offset from the first brace 30 by a distance 70. The distance 68 is the distance between the first and the second braces 30 and 62 in a vertical direction and the distance 70 is the distance between the first and the second braces 30 and 62 in a horizontal direction.

A winch shaft 72 is disposed between the first and the second side plates 24 and 26. A shaft 74 has opposite ends with one end being journally supported in the first side plate 24 and the opposite end being journally supported in the second side plate 26. The shaft 74 extends between the first and the second side plates 24 and 26, the shaft 74 also extending through a central portion of the winch shaft 72. The shaft 74 is connected to the winch shaft 72 such that the rotation of the shaft 74 causes the rotation of the winch shaft 72. One end of the shaft 74 extends through the first side plate 24 and a turning handle 76 is connected to the end of the shaft 74 extending through the first side plate 24. The winch shaft 72, the shaft 74, the turning handle 76, and the first and the second side plates 24 and 26 comprise a winch 78.

One end of a cable 80 is connected to the winch shaft 72. The winch 78 is constructed to retrieve the cable 80 pulling the cable 80 in a direction 82 when turning the turning handle 76 in the direction 84.

A cow 90 is shown in FIG. 1 having opposite sides 92 and 94, a back 96, a stomach 98, and front legs 100, the cow also having rear legs (not shown in FIG. 1). The cow 90 is shown in FIG. 1 lying generally on the side 94 of the cow 90.

In operation, the animal handling apparatus 10 is moved to a position generally near the animal's 90 back 96, and then the cable 80 is pulled from the winch 78. The cable 80 is inserted under the animal 90 and the end of the cable 80, opposite the end which is connected to the winch shaft 72, is secured about the animal's 90 two front legs 100, generally near the animal's hoofs. After the cable 80 has been securedly connected about the animal's 90 two front legs 100, the animal handling apparatus 10 is moved to a position wherein the first brace 30 engages the animal's 90 back 96 generally near the animal's 90 side 94 which is disposed generally adjacent the ground, the second brace 62 engaging the animal's 90 back 96 at a position spaced from the engagement between the first brace 30 and the animal's 90 back 96 and generally between the animal's 90 sides 92 and 94.

After positioning the animal handling apparatus 10 in the position just described, the turning handle 76 is rotated in the direction 84 to pull the cable 80 in the direction 82 thereby pulling the animal's 90 front legs 100 generally toward the animal's 90 stomach 98, the animal's 90 front legs 100 being folded at the knee joint and the animal's 90 folded front legs 100 being pulled toward the animal's 90 stomach 98. The turning handle 76 is rotated in the direction 84 until the cable 80 has been pulled in the direction 82 to a position wherein the cable 80 is taut. The engagement between the first and the second braces 30 and 62 and the animal 90 permit the cable 80 to be pulled taut and cooperate in maintaining the cable 80 taut as the animal 90 is turned over from one side to the other side.

After the cable 80 has been pulled taut, the handle 38 manually is moved in the direction 104. As the handle 38 is moved in the direction 104, the first and the second braces 30 and 62 each engage the animal 90 and the cable 80 pulls the animal's 90 front legs 100 in the direction 106 thereby pulling the animal's 90 front legs 100 under the animal 90. The movement of the handle 38 in the direction 104 thus pulls the animal's 90 front legs 100 under the animal 90 and rotates the animal 90 in the direction 106 to turn the animal 90 over from the side 94 engaging the ground to the opposite side 92 engaging the ground. In turning the animal 90, the first and the second braces 30 and 62 cooperate to maintain the cable 80 taut and the engagement between the first brace 30 and the animal 90 cooperates as a fulcrum effect to facilitate in turning the animal from one side to the other. Also, the engagement between the first brace 30 and the animal fixes one point and facilitates in pulling the animal's front legs back under the animal.

Changes may be made in the construction and operation of the various elements described herein with respect to the animal handling apparatus without departing from the spirit and the scope of the invention as defined in the following claims.

What is claimed is:

1. An animal handling apparatus for turning over from one side to the opposite side a relatively large animal with front and rear legs, a back, a stomach, and opposite sides, comprising:
   a frame having a first end and a second end;
   a first brace connected to the frame generally near the first end of the frame, the first brace being positioned on the frame to be engageable with a portion of the animal to be turned;
   a winch connected to the frame;
   a cable having one end connected to the winch, the opposite end of the cable being connectable to at least some of the animal's legs and the winch for pulling the cable with the animal's legs connected thereto toward the animal's body; and
   a handle having one end connected to the frame and the handle extending a distance from the frame terminating with an opposite end, the handle being manually movable in a direction to cooperate in turning the animal over from one side to the other side after the winch has pulled the cable to bring the animal's legs connected to the cable to a position generally near the animal's body, the first brace being engageable with the animal to maintain the cable taut as the handle is moved to pull the animal's legs in a direction generally under the animal and as the animal is turned over from one side to the opposite side.

2. The animal handling apparatus of claim 1 wherein the handle is defined further as having the one end connected to the first brace, the handle being connected to the first end of the frame via the first brace.

3. The animal handling apparatus of claim 1 wherein the handle extends angularly from the frame.

4. The animal handling apparatus of claim 3 defined further to include:
- a first frame bar having opposite ends, one end of the first frame bar being connected to the handle generally between the opposite ends of the handle, the first frame bar extending angularly from the handle;
- a second frame bar having opposite ends, one end of the second frame bar being connected to the handle generally between the opposite ends of the handle, the second frame bar extending angularly from the handle, the ends of the first and second frame bars, opposite the ends connected to the handle, being spaced apart and generally aligned; and
- a second brace connected to the ends of the first and the second frame bars and being engageable with the animal during the turning over of the animal from one side to the opposite side.

5. The animal handling apparatus of claim 4 wherein the first and the second frame bars are positioned to support the second brace spaced a vertical distance generally above the first brace and spaced a horizontal distance from the first brace.

6. The animal handling apparatus of claim 4 wherein the frame is defined further to include:
- a first side bar; and
- a second side bar extending generally parallel with the first side bar, the first brace being connected to one end of the first side bar and to one end of the second side bar, a portion of the first frame bar generally between the opposite ends of the first frame bar being connected to the first side bar generally between the opposite ends of the first side bar, and a portion of the second frame bar generally between the opposite ends of the second frame bar being connected to the second side bar generally between the opposite ends of the second side bar.

7. The animal handling apparatus of claim 6 wherein the winch is defined further to include:
- a first side plate connected to the first side bar generally near the second end of the frame, the first side plate extending a distance from the first side plate;
- a second side plate connected to the second side bar generally near the second end of the frame, the second side plate extending a distance from the second side plate and being spaced a distance from the first side plate;
- a winch shaft disposed generally between the first and the second side plates, one end of the cable being connected to the winch shaft;
- a shaft having one end journally connected to the first side plate and the opposite end journally connected to the second side plate, the shaft being connected to the winch shaft; and
- a turning handle connected to the shaft for turning the shaft and the winch shaft connected thereto.

8. The animal handling apparatus of claim 1 wherein the cable is defined further as being connectable to the animal's front legs.

* * * * *